Patented Mar. 7, 1950

2,499,992

UNITED STATES PATENT OFFICE 2,499,992

INSECTICIDE COMPOSITION COMPRISING DI-(MONOCHLOROPHENOXY) - METHANE AND 1.1 - DI - (MONOCHLOROPHENYL)-ETHANE

Curtis E. Dieter and Oscar H. Hammer, South Haven, Mich., assignors to The Dow Chemical Company, Midland, Mich., a corporation of Delaware No Drawing. Application September 18, 1947, Serial No. 774,886

2 Claims. (Cl. 167—30)

This invention relates to insecticides and is particularly concerned with a new and improved toxicant composition including a mixture of di-(monochlorophenoxy) - methane and 1.1 - di-(monochlorophenyl)-ethane.

Di-(monochlorophenoxy)-methane is disclosed as to method of preparation and parasiticidal properties in United States Patent No. 2,330,234. This compound, and particularly the para isomer, di-(4-chlorophenoxy)-methane, is shown as being an effective toxicant for the control of a number of insect pests.

Similarly, 1.1-di-(monochlorophenyl)-ethane has been observed to have parasiticidal characteristics. This compound and its insecticidal properties are disclosed in application Serial No. 668,478, filed May 9, 1946, and now abandoned.

While both of the named compounds have value in the control of insects and related agricultural pests, situations not infrequently arise where limited tolerance of host vegetation or other factors make impractical the use of the compounds as recommended. In such instances it is frequently desirable to accomplish the control of a given pest with smaller amounts and lower concentrations of toxicant than are normally effective when either of the compounds is used alone.

Other shortcomings of synthetic organic toxicants generally include their relative specificity not only to different varieties of insects but to different forms in the life cycle of a single insect. Thus, a given compound may be effective against the adult form of a given insect, and substantially without effect against the eggs and young. Conversely, the compound may be an excellent ovicide without having appreciable toxicity against the mature organism. Other synthetic organic toxicants, effective against some insects and mites also destroy existent parasites and so upset the biological balance, permitting the building up of high populations of obnoxious and destructive pests.

It is an object of the present invention to provide a new composition of matter which will be more effective against insect pests than many existing compositions. A further object is the provision of a such composition in which the constituents will co-operate with each other to exert a synergistic effect as regards toxicity to representative insect pests. An additional object is to provide means for the control of insect pests which will make possible the obtaining of adequate control with materially reduced concentrations of toxicants. Other objects will become apparent from the following specification.

According to the present invention 1.1-di-(monochlorophenyl)-ethane is mixed with di-(monochlorophenoxy)-methane to obtain an improved toxicant product. When this composition is compounded in conventional spray and dust mixtures, the toxicants are mutually activating so that the combination exerts a toxicity against insects and mites which is greater than additive with respect to that shown by the constituent toxicants in equivalent amounts.

The expression, 1.1-di-(monochlorophenyl)-ethane, as herein employed, refers particularly to the isomeric mixture obtained by the reaction of ethylidene dichloride with monochlorobenzene in the presence of anhydrous aluminum chloride as catalyst at a temperature of approximately 40°–50° C. This mixed product is an oily material boiling at 157°–160° C. at 4 millimeters pressure. The preferred embodiment of the invention resides in 1.1-di-(4-chlorophenyl)-ethane which may be isolated from the crude reaction mixture by fractional crystallization. This compound melts at 53°–54° C. when crystallized out of ethyl alcohol.

The di-(monochlorophenoxy)-methanes are obtained by reacting substantially equimolecular proportions of a sodium monochlorophenolate with dichloromethane, in a reaction media of absolute ethanol, at a temperature between about 80° and 150° C., and under autogenous pressure. The preferred embodiment as regards this constituent of the mixture is di-(4-chlorophenoxy)-methane melting at 67°–69° C.

In carrying out the invention, the 1.1-di-(monochlorophenyl)-ethane and di-(monochlorophenoxy)-methane may be mixed together in any suitable method, e. g. by grinding, mixing, dissolving one in the other, etc. The exact proportion of materials employed varies with the parasite to be controlled, the tolerance of the host plant for the constituents of the toxicant mixture, the form in which the toxicant is to be applied, and conditions under which such application is to be made. In general, from about 0.5 to 4 parts of the 1.1-di-(monochlorophenyl)-ethane is employed for each part of di-(monochlorophenoxy)-methane. While these proportions result in products of unusually desirable properties as regards adhesion to plant surfaces and increased residual toxicity, it is to be understood that any suitable proportions of constituents may be employed.

Any suitable concentration of the toxicant mixtures may be applied for pest control in spraying operations. Where the mixture is dispersed in water to produce a product adapted for use in large scale and field applications, from about 0.5 to 2.0 pounds of toxicant per 100 gallons of aqueous spray is preferred. When the new composition is dissolved in organic solvent and employed for the control of household insects, a concentration of from about 1 to 3 percent by volume is generally adequate. In dust mixtures from about 1 to 10 percent by weight is a satisfactory concentration.

The toxicant materials may be compounded with various inert carriers such as diatomaceous earth, bentonite, talc, sulphur, gypsum, or lime to form agricultural dusts adapted to be applied in standard dusting equipment. If desired, such dusts may be employed as concentrates and subsequently dispersed in water or other liquid carriers to form sprays. The toxicant materials may also be incorporated with various wetting, dispersing and sticking agents such as soaps, sulfonated oils and their salts, high molecular weight esters, sulfonated higher alcohols, and various available commercial wetting agent compositions, to form concentrates adapted to be further diluted to produce dust or spray materials. In the preparation of such concentrates, as distinguished from finished dusts and sprays, from about 5 to 95 percent by weight of the toxicant mixture is commonly employed.

In other embodiments of the invention, the mixture of toxicants may be dispersed in oil, oil-water emulsions, or employed in simple water suspension with or without the addition of emulsifying, wetting or dispersing agents.

Similarly, the individual toxicants may be formulated into concentrates and the latter mixed in desired proportion to form spray or dust compositions at time of application.

The following illustrates the practice of the invention.

12.5 parts by weight of 1.1-di-(monochlorophenyl)-ethane, 12.5 parts of di-(4-chlorophenoxy)-methane, 74.5 parts of a natural fuller's earth (an attapulgite type clay marketed as "Diluex") and 0.5 part of a sodium lauryl sulfate composition were mixed and ground together to obtain a concentrate composition. Four pounds of this concentrate was dispersed in sufficient water to give 100 gallons of diluted spray product. This diluted spray contained 0.5 pound each of 1.1-di-(monochlorophenyl)-ethane and of di-(4-chlorophenoxy)-methane. This product was applied with conventional spray apparatus to apple trees of the Golden Delicious variety which were heavily infested with European red mite (*Paratetranychus pilosus*). The treatment was made during the late summer growing season and in a period of comparative drought and high temperature which predisposed the red mites to greater reproduction and resistance to chemical control. Five days after spraying, the foliage and fruit of the sprayed trees were carefully inspected. It was found that the indicated treatment had accomplished a reduction of 98.4 percent in mite population.

In similar operations, 25 parts by weight of 1.1-di-(monochlorophenyl)-ethane was dispersed by grinding and mixing with 74.5 parts by weight of the fuller's earth (Diluex) and 0.5 part of sodium lauryl sulfate. When dispersed in water and applied to apple trees adjacent to those described in the preceding paragraph, a control of only 5.9 percent of red mite was obtained at a toxicant concentration of 0.5 pound per 100 gallons of spray.

A similar comparison was made with a spray composition containing 0.5 pound of di-(4-chlorophenoxy)-methane per 100 gallons of spray mixture. Here again, the toxicant was employed as a concentrate dispersed with fuller's earth (Diluex) and the sodium lauryl sulfate wetting agent. In this operation, the spraying of the apple trees gave a control of 74 percent of the red mites. In a further determination, it was found that 2 pounds of the toxicant per 100 gallons was required to give a control of 98.1 percent against the red mites.

A further determination was carried out to establish the comparative residual toxicity exerted by 1.1-di-(monochlorophenyl)-ethane and di-(4-chlorophenoxy)-methane alone and by a composition comprising a mixture of the two materials. In this operation, mature plants of cranberry bean were thoroughly wet with spray mixtures including mixtures of the toxicants and each of the toxicants alone. One day after application, each bean plant was infested with approximately 100 adults of the two-spotted mite. At intervals of 5 and 8 days after this infestation, the bean plants were carefully examined and the degree of mite control determined.

After 5 days it was found that the compositions containing 1 pound of 1.1-di-(monochlorophenyl)-ethane and of di-(4-chlorophenoxy)-methane alone per 100 gallons had caused mortalities of only 1 percent and 10 percent of the mites, respectively. The spray composition containing the mixture of 1 pound each of the toxicants per 100 gallons had caused a 44 percent mortality of the mites.

After the 8 day interval, it was found that at 1 pound per 100 gallons the 1.1-di-(monochlorophenyl)-ethane and di-(4-chlorophenoxy)-methane had caused mite mortalities of 2 percent and 18 percent, respectively. The combination of 1 pound each of the toxicants per 100 gallons had accomplished a mite control of 56 percent.

It was also observed that the mixture of toxicants had accomplished a 100 percent control of mite eggs at both the 5 day and 8 day interval.

We claim:

1. An insecticidal composition comprising as mutually activating toxic ingredients equal parts by weight of 1,1-di-(monochlorophenyl)-ethane and di-(4-chlorophenoxy)-methane.

2. An insecticidal concentrate adapted to be diluted with water to produce agricultural spray compositions and including as mutually activating toxic ingredients equal parts by weight of 1,1-di-(monochlorophenyl)-ethane and di-(4-chlorophenoxy)-methane.

CURTIS E. DIETER.
OSCAR H. HAMMER.

REFERENCES CITED

The following references are of record in the file of this patent:

UNITED STATES PATENTS

| Number | Name | Date |
|---|---|---|
| 2,330,234 | Moyle | Sept. 28, 1943 |

OTHER REFERENCES

Busvine: "Insecticidal tests with analogues of DDT," Journal Soc. Chem. Ind., Nov. 1946, pages 356–360, page 358 esp. pertinent.

Nature, Aug. 11, 1945, pages 169–170.